R. W. ELDER.
VALVE.
APPLICATION FILED APR. 28, 1908.

966,390.

Patented Aug. 2, 1910.

Witnesses
J. T. L. Wright

Inventor
Robert W. Elder,
By Victor J. Evans,
Attorney

UNITED STATES PATENT OFFICE.

ROBERT W. ELDER, OF FINCH, WEST VIRGINIA.

VALVE.

966,390.

Specification of Letters Patent. Patented Aug. 2, 1910.

Application filed April 28, 1908. Serial No. 429,760.

*To all whom it may concern:*

Be it known that I, ROBERT W. ELDER, a citizen of the United States, residing at Finch, in the county of Ritchie and State of West Virginia, have invented new and useful Improvements in Valves, of which the following is a specification.

This invention relates to check valves for steam boilers and other uses, and the object of the invention is to provide a valve of this character which is extremely simple in construction, efficient in action, and the parts of which are so arranged as to be readily detachable and interchangeable.

With these and other objects in view the invention resides in the novel construction of check valves, hereinafter fully described and claimed.

Figure 1:
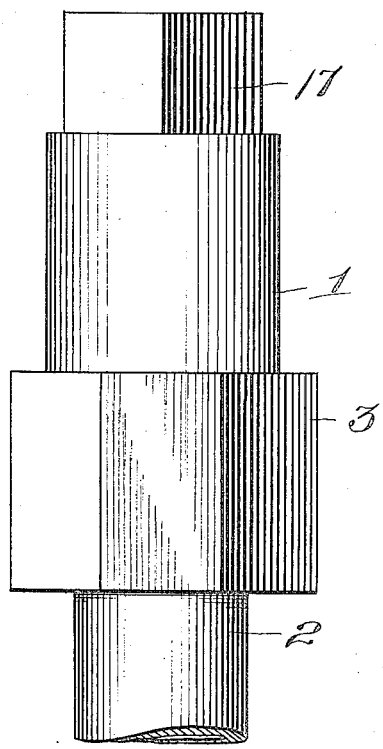
Figure 2:
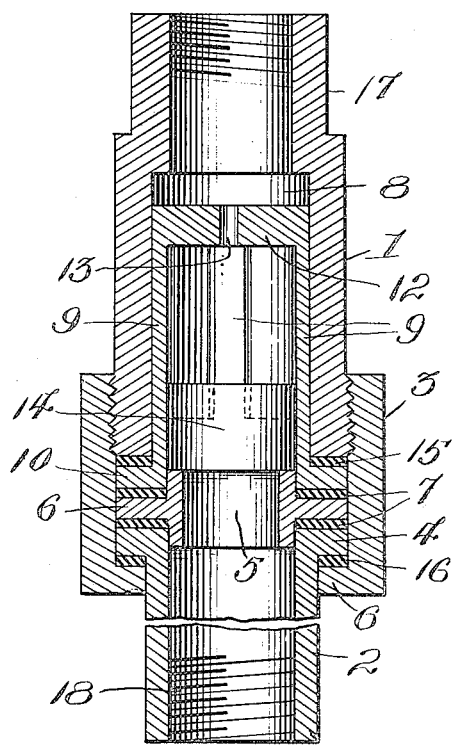
Figure 3:
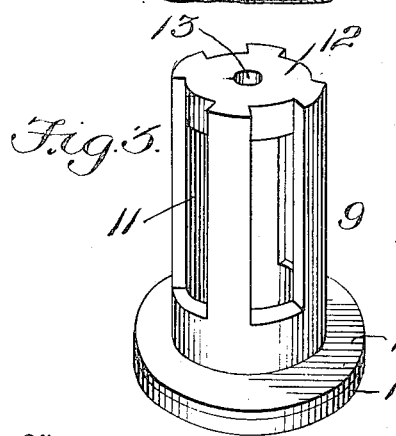
Figure 4:
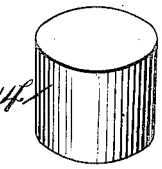
Figure 5:
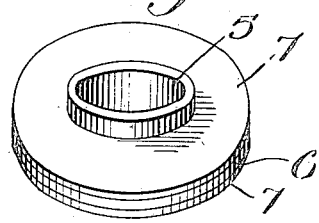

Figure 1 is a side elevation of the check valve. Fig. 2 is a central longitudinal sectional view of the same. Fig. 3 is a perspective view of the valve cage. Fig. 4 is a similar view of a valve. Fig. 5 is a perspective view of the valve seat.

In the accompanying drawings the numeral 1 designates the upper section of the valve casing, 2 the lower section, and 3 the union connecting the sections. The section 2 is provided with an annular flange 4 adapted for the reception of the reversible valve seat 5 and also for engagement with the flange 6 of the union 3. The union 3 is provided with interior threads adapted for engagement with exterior threads provided upon the section 1, and by which the section and union are connected.

The valve seat 5 comprises a central member, preferably cylindrical in cross section and provided with a central annular flange 6'. The flange 6' is provided upon its top and bottom faces with packing rings 7, and is adapted to be positioned upon the flange 4 of the section 2, while the central portion or collar of the valve seat engages within the bore of the section.

The section 1 is provided with an annular enlarged longitudinally extending opening 8 communicating with the bore of the member, and this opening is adapted for the reception of a valve cage 9. The valve cage 9 is provided with an annular flange 10 adapted to be positioned upon the flange 6 of the valve seat 5 and to be retained in position thereon by the threaded portion of the upper section 1.

The valve cage 9 is provided with a vertically extending body portion provided with a plurality of cut away portions 11 and having a head 12 also provided with cut away portions to assure a free passage of water through the cage to the upper section 1 of the valve casing. The head 12 is provided with a central opening 13 and the valve cage is adapted for the reception of the sliding valve 14, which is adapted to be seated upon the valve seat 5 when the passage of the valve casing is closed as shown in Fig. 2 of the drawings. The collar or central portion 5 of the valve seat is adapted to be positioned within the bore or open end of the valve cage 9, and suitable packing rings 15 and 16 are arranged between the flange of the valve cage and the pipe section 1 and the flange 4 and flange 6 of the union.

It will be noted that the upper portion of the section 1 is provided with a squared wrench hold 17 and that the interior of the section is provided with suitable screw threads whereby it may be readily attached to a section of pipe. The lower section 2 of the valve casing is also provided with threads 18 by which it may be attached to the inlet water supply pipe.

The improved device is adapted for use between a pump or an injector and a boiler and is adapted to prevent the outlet of steam from the boiler when the pump or injector is not working. With my construction it will be noted that a straight passage is provided between the pump and the boiler, the opening 13 being provided so as to direct a flow of steam directly to the center of the valve 14. It will also be noted by reference to Fig. 3 of the drawings that the cut away portions 11 of the valve cage 9 do not extend entirely to the flange 10 and this solid portion serves to keep the valve 14 properly upon its seat when the pump or injector is not working.

Having thus fully described the invention what is claimed as new is:

A check valve adapted to be connected with a pump or injector and a boiler comprising a pair of pipe sections having their openings arranged in a direct path, one of said sections having its opening enlarged adjacent one of its ends a valve cage within this enlarged portion, a reversible valve seat between the sections, a union connecting both of the sections, the valve cage being provided with a flange and having its walls provided with a plurality of longitudinally extending slots, the said slots terminating a distance away from the flange of the cage, the head of the cage being provided with a central opening, and a sliding valve within
5 the cage adapted to contact the seat and the non-cutaway portions of the valve cage when the pump or injector is not working.

In testimony whereof I affix my signature in presence of two witnesses.

ROBERT W. ELDER.

Witnesses:
W. J. WISWALL,
W. J. GRIFFIN.